(12) United States Patent
Ono et al.

(10) Patent No.: US 9,097,560 B2
(45) Date of Patent: Aug. 4, 2015

(54) OPTICAL ENCODER INCLUDING SCALE HAVING TRACK AND DETECTION HEAD FOR DETECTING THE TRACK

(71) Applicant: MITUTOYO CORPORATION, Kawasaki-shi, Kanagawa (JP)

(72) Inventors: Kimitoshi Ono, Kawasaki (JP); Hiroaki Kawada, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 195 days.

(21) Appl. No.: 13/913,025

(22) Filed: Jun. 7, 2013

(65) Prior Publication Data

US 2013/0327930 A1 Dec. 12, 2013

(30) Foreign Application Priority Data

Jun. 11, 2012 (JP) ................................. 2012-132315

(51) Int. Cl.
*G01D 5/347* (2006.01)
*G02B 7/02* (2006.01)
*G01D 5/34* (2006.01)

(52) U.S. Cl.
CPC .............. *G01D 5/34715* (2013.01); *G01D 5/34* (2013.01); *G02B 7/02* (2013.01)

(58) Field of Classification Search
CPC combination set(s) only.
See application file for complete search history.

(56) References Cited

U.S. PATENT DOCUMENTS 5,233,382 A * 8/1993 Taniguchi et al. ............ 396/113

* cited by examiner

*Primary Examiner* — Francis M Legasse, Jr.
(74) *Attorney, Agent, or Firm* — Rankin, Hill & Clark LLP

(57) ABSTRACT

An optical encoder includes a detection head. The detection head includes an optical system including a lens including a pair of bosses integrally formed with the lens and disposed with an optical axis of the lens therebetween, and an aperture plate having a pair of reference-pin-insertion holes disposed with an aperture therebetween; a housing including a pair of attachment portions and having a pair of lens-boss-insertion holes and a pair of reference-pin-insertion holes disposed on a central symmetry plane; a lens holder having a pair of lens-boss-insertion holes and a pair of reference-pin-insertion holes disposed on the central symmetry plane; and a pair of reference pins for positioning the lens holder and the aperture plate relative to the housing. An optical axis of the optical system is adjusted with respect to the bosses and the reference pins.

4 Claims, 5 Drawing Sheets

OPTICAL ENCODER INCLUDING SCALE HAVING TRACK AND DETECTION HEAD FOR DETECTING THE TRACK

CROSS REFERENCES TO RELATED APPLICATIONS

The present invention contains subject matter related to Japanese Patent Application No. 2012-132315 filed in the Japan Patent Office on Jun. 11, 2012, the entire contents of which are incorporated herein by reference.

BACKGROUND OF THE INVENTION

1. Field of the Invention

The present invention relates to an optical encoder and to a lens fixing mechanism of the optical encoder. In particular, the present invention relates to an optical encoder that detects a track on a scale by forming an image of the track on a light-receiving element by using an imaging optics including a plurality of lenses and an aperture plate, and to a lens fixing mechanism that is preferably used for such an optical encoder.

2. Description of the Related Art

FIG. 1 illustrates an example of an optical encoder including a detection head 1 having an imaging optics. The optical system forms an image 3 of a scale 2 on a light-receiving element 4. In particular, Japanese Unexamined Patent Application Publications Nos. 2011-13093 and 2011-59055 each describe an optical encoder including a double telecentric optical system in which lenses 5 and 6 are disposed on the two sides of the aperture plate 7. Such an encoder has an advantage in that distortion of an image due to variation in the gap between the scale 2 and the lens 5 on the front side and the gap between the lens 6 on the rear side and the light-receiving element 4 is small. In FIG. 1, an arrow X indicates the longitudinal direction of the scale, and an arrow Z indicates the optical axis direction.

A pair of identical optical systems may be parallelly arranged in an optical encoder having a two-track scale. In this case, a lens array is used in order to reduce the size of the optical encoder and simplify the components of the optical encoder, as described in Japanese Unexamined Patent Application Publications Nos. 2012-32295 and 2008-3014. In order to reduce the number of lenses and to eliminate optical aberrations by using only two lenses, aspherical lenses are used. FIG. 2 is a schematic view of an optical encoder including a double telecentric optical system including a two-track scale 12, an entry-side lens array 13, and an exit-side lens array 14. In FIG. 2, an arrow X indicates the longitudinal direction of the scale, and an arrow Y indicates the lateral direction. As described in Japanese Unexamined Patent Application Publications Nos. 2008-3421 and 2008-3466, a plastic is preferably used as a material of a compact high-accuracy aspherical lens. Hereinafter, it will be assumed that lenses are made of a plastic.

In order to achieve required optical characteristics, it is necessary that these optical elements be assembled with a relative positional accuracy of about a hundred micrometers.

Moreover, in an optical encoder having a two-track scale, in order to detect each track of the two-track scale by using two independent optical systems disposed in one detection head, it is necessary that the axis of the two-track scale 12 in the lateral direction (Y direction) and a line connecting the optical axes of the two optical systems be parallel to each other with high accuracy. Deviation from parallel (yawing) causes a decrease in the signal detection efficiency of an incremental encoder and positional error between the two tracks (inter-track error).

In a double telecentric optical system illustrated in FIGS. 3A and 3B, it is required that the focal points of both lenses be positioned at the aperture plate 7 with high accuracy, and it is necessary that the entry-side lens array 13 be fixed to a metal housing 15 of the detection head with high accuracy.

The lens arrays 13 and 14 may be fixed to the housing 15 by using a method including steps of, for example, forming bosses 13A and 14A on the lens arrays 13 and 14 so as to be located on a line connecting the optical axes of the lens arrays 13 and 14, applying an adhesive to the bosses 13A and 14A, and inserting the bosses 13A and 14A into boss-insertion holes 15A in the housing 15. With this method, as suggested in Japanese Unexamined Patent Application Publication No. 2004-93556, a surface of the lens (5 or 6) and the bosses 13A or 14A can be integrally formed by using a single die, so that the optical system can be easily manufactured with high accuracy. FIG. 3A is a schematic sectional view illustrating the entry-side lens array 13 and the housing 15, which are bonded to each other.

However, when the ambient temperature changes, a stress is applied to an adherend surface 13B of the entry-side lens array 13 as illustrated in FIG. 3B, because a plastic material of the lens arrays 13 and 14 has a coefficient of linear expansion (about $60 \times 10^{-6}$ $mK^{-1}$) that is about three times larger than that of a metal material of the housing 15, such as aluminum ($23 \times 10^{-6}$ $mK^{-1}$). Moreover, because a stress is not generated on a side of the entry-side lens array 14 opposite to the adherend surface 13B, the entry-side lens array 13 receives a bending force indicated by arrows A. As a result, the surfaces of the lenses 5 of the entry-side lens array 13 become deformed as illustrated by broken lines, thereby causing a decrease in the contrast or distortion of an image, which may lead to reduction in the efficiency of an encoder signal and reduction in accuracy. The same applies to the exit-side lens array 14.

Japanese Unexamined Patent Application Publication No. 2008-3466 describes a technology for reducing variation in the curvature of a lens due to temperature variation by mechanically restraining a plastic lens by using a metal plate. However, this technology is not sufficiently effective.

SUMMARY OF THE INVENTION

Accordingly, it is an object of the present invention to facilitate assembly of optical elements of a detection head of an optical encoder, to increase the accuracy of assembly of the optical elements, and to increase the stability of the performance of the optical encoder against temperature variation.

According to a first aspect of the present invention, there is provided an optical encoder including a scale having a track and a detection head for detecting the track. The detection head includes an imaging optics, a housing, a lens holder, a pair of reference pins, and a light-receiving element. The imaging optics includes a lens and an aperture plate. The lens includes a pair of bosses that are integrally formed with the lens, the bosses being disposed with an optical axis of the lens therebetween. The aperture plate has a pair of reference-pin-insertion holes that are disposed with an aperture therebetween. The housing has a pair of lens-boss-insertion holes and a pair of reference-pin-insertion holes that are disposed on a central symmetry plane, and the housing includes a pair of attachment portions that are disposed so as to be symmetrical with each other. The lens holder has a pair of lens-boss-insertion holes and a pair of reference-pin-insertion holes that are disposed on the central symmetry plane. The reference pins position the lens holder and the aperture plate relative to the housing. The imaging optics forms an image of the track on the light-receiving element. An optical axis of the imaging optics is adjusted with respect to the bosses and the reference pins.

In the optical encoder, the track may be provided in a plurality, and the lens may be a lens array including a plurality of lenses that are parallelly arranged so as to correspond to the tracks.

In the optical encoder, a fixing surface of the lens at which the lens is fixed to the housing or to the lens holder may be disposed on a plane that bisects the volume of the lens.

According to a second aspect of the invention, there is provided a lens fixing mechanism of an optical encoder including a lens having a fixing surface at which the lens is fixed to a housing or to a lens holder. The fixing surface is disposed on a plane that bisects the volume of the lens.

With the present invention, the lens and the aperture plate are assembled together with respect to the boss-insertion holes formed in the housing and in the lens holder, so that the optical system can be easily assembled with high accuracy. By using, for example, a plastic as the material of the lens, the lens surface and the bosses can be integrally formed with each other easily, so that the accuracy of the positions and the dimensions of the lens surface and the bosses can be increased. Moreover, by directly attaching the lens to the housing, the position of a mechanical reference surface of the housing relative to the position of the optical system can be adjusted with high accuracy. Therefore, the level of accuracy required for a reference surface of an external apparatus to which the optical encoder is attached can be reduced. Moreover, because the boss-insertion holes in the housing, the bosses of the lens, and the boss-insertion holes in the aperture plate are arranged on the central symmetry plane of the housing, even when expansion or contraction of an optical element occurs due to temperature variation, displacement of the axes of the housing, the lens, and the aperture plate in the X-axis direction does not occur in principle and the distance between the optical axis and a measurement point on the track does not change. Therefore, position detection can be performed stably.

In the case where the fixing surface of the lens, at which the lens is attached to the housing or to the lens holder, is disposed on a plane that bisects the volume of the lens, distortion of the lens surface due to temperature variation can be reduced and distortion of an image is suppressed with a simple low-cost structure, and thereby decrease in the output of encoder signal due to temperature variation can be suppressed.

DESCRIPTION OF THE PREFERRED EMBODIMENTS

Hereinafter, embodiments of the present invention will be described with reference to the drawings.

Figure 4:
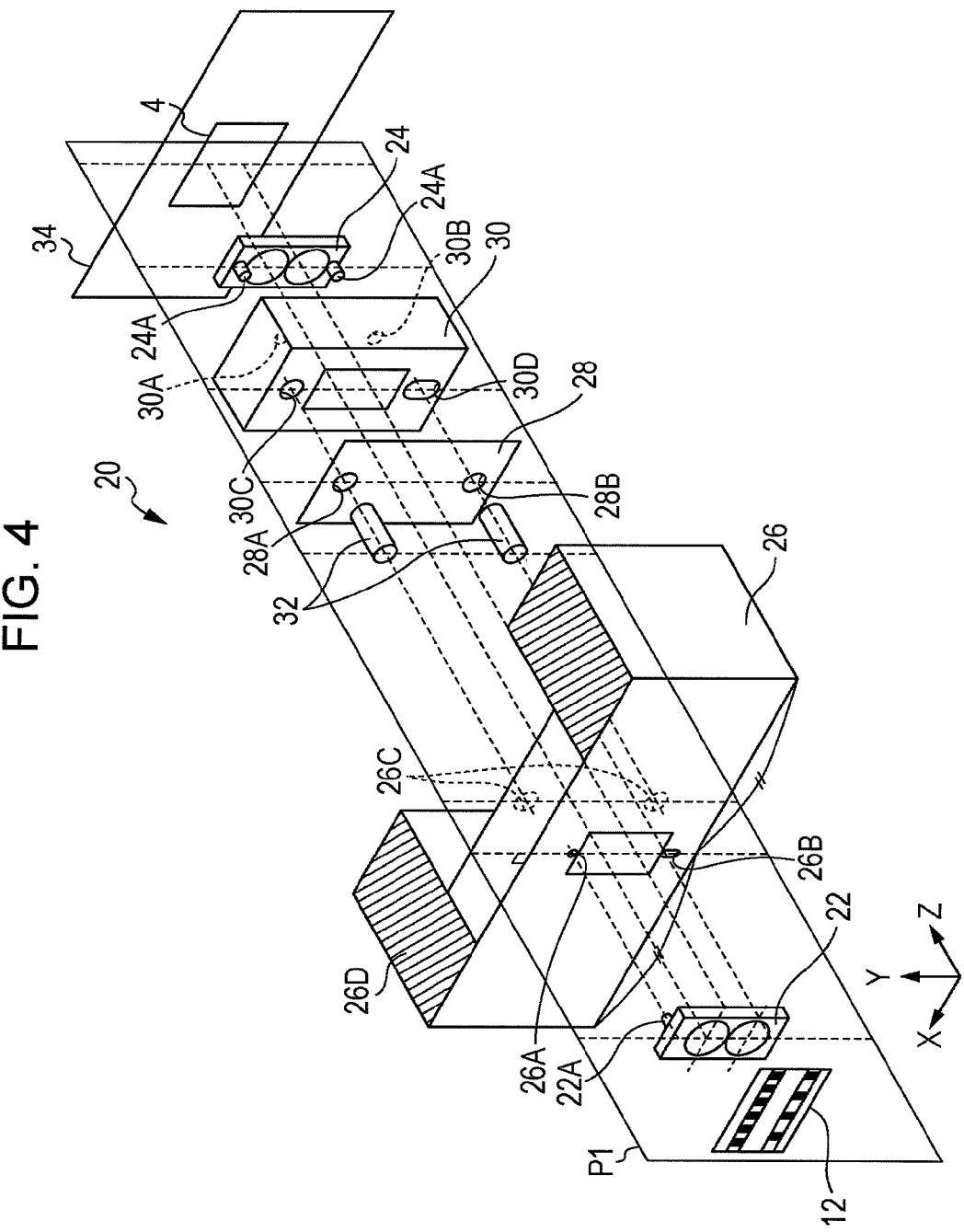
FIG. 4 is a schematic perspective view of an optical encoder according to a first embodiment of the present invention.

FIG. 4 is a schematic perspective view of a detection head of an optical encoder according to a first embodiment of the present invention. For simplicity, a cover, screws, and the like are omitted.

As illustrated in FIG. 4, the optical encoder according to the present embodiment detects tracks on a two-track scale 12 by forming an image of the tracks on a light-receiving element 4 by using an imaging optics including a lens and an aperture plate. The optical encoder includes a detection head 20 including an entry-side lens array 22, an exit-side lens array 24, a housing 26, an aperture plate 28, a lens holder 30, and a pair of reference pins 32. The lens arrays 22 and 24 are made of, for example, a plastic. The lens arrays 22 and 24 respectively include a pair of bosses 22A and a pair of bosses 24A, which are integrally formed with the lens arrays 22 and 24 and which are disposed on a center line that connects two optical axes to each other. The housing 26 has a boss-insertion hole 26A and an elongated hole 26B (hereinafter, referred to as boss-insertion holes), into which the bosses 22A of the entry-side lens array 22 are inserted, and a pair of reference-pin-insertion holes 26C. The holes 26A, 26B, and 26C are disposed on a central symmetry plane P1. The housing 26 includes a pair of attachment portions 26D that are disposed so as to be symmetrical with each other. The aperture plate 28 has a pair of reference-pin-insertion holes 28A and 28B that are disposed with a pair of apertures therebetween. The lens holder 30 has a boss-insertion hole 30A and an elongated hole 30B (hereinafter, referred to as boss-insertion holes), into which the bosses 24A of the exit-side lens array 24 are inserted, and a reference-pin-insertion hole 30C and an elongated hole 30D (hereinafter, referred to as "boss-insertion holes"), into which the reference pins 32 are inserted. The holes 30A, 30B, 30C, and 30D are disposed on the central symmetry plane P1. The reference pins 32 are used to position the lens holder 30 and the aperture plate 28 relative to the housing 26. The optical axis of the imaging optics is adjusted with respect to the bosses 22A and 24A and the reference pins 32.

To be specific, the detection head 20 includes an optical system, which includes the entry-side lens array 22, the exit-side lens array 24, and the aperture plate 28; the housing 26; the lens holder 30; and a photosensor substrate 34.

In the housing 26, the boss-insertion holes 26A and 26B are arranged on the central symmetry plane P1, which bisects the housing 26 in the X direction.

The entry-side lens arrays 22 and the exit-side lens array 24 have the same shape and each have two optical axes. The pairs of bosses 22A and 24A are disposed on end portions of the lens arrays 22 and 24 on the center lines connecting the two optical axes. The lens arrays 22 and 24 are each made of a plastic, and the bosses 22A and 24A are integrally formed with the lens arrays 22 and 24. The entry-side lens array 22 and the housing 26 are assembled together by inserting the bosses 22A into the boss-insertion holes 26A and 26B in the housing 26.

In a surface of the housing 26 on which the aperture plate 28 is disposed, the pair of reference-pin-insertion holes 26C are formed on the central symmetry plane P1, and the reference pins 32 are inserted into the reference-pin-insertion holes 26C. The pair of apertures are formed in the aperture plate 28. The reference-pin-insertion holes 28A and 28B are formed in the aperture plate 28 so as to be arranged on a central symmetry line that connects the optical axes of the apertures to each other. The aperture plate 28 is positioned with respect to the reference pins 32.

The reference-pin-insertion holes 30C and 30D are formed in the lens holder 30. The reference pins 32 are inserted into the reference-pin-insertion holes 30C and 30D.

The exit-side lens array 24 includes the bosses 24A. The exit-side lens array 24 and the lens holder 30 are assembled together by inserting the bosses 24A into the boss-insertion holes 30A and 30B in the lens holder 30.

The photosensor substrate 34 is attached to the housing 26.

The entirety of the detection head 20 is attached to an external apparatus (not shown) so that the position of a reference surface of the external apparatus is appropriately adjusted relative to the attachment portions 26D of the housing 26.

Figure 5:
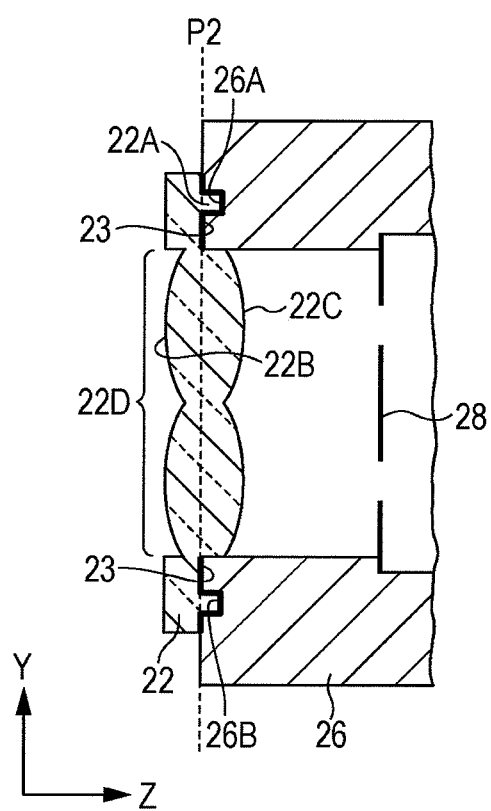
FIG. 5 is a schematic sectional view illustrating portions of a lens array that are bonded to a housing of the optical encoder according to the first embodiment.

FIG. 5 illustrates an example in which a lens fixing mechanism according to the first embodiment is used to fix the entry-side lens array 22 to the housing 26. As described above, the housing 26 of the detection head, which has the boss-insertion holes 26A and 26B, and the entry-side lens array 22, on which the bosses 22A are integrally formed, are provided. The housing 26 is made of aluminum, and the entry-side lens array 22 is made of a plastic and has a plate-like shape. The entry-side lens array 22 has an entry-side lens surface 22B and an exit-side lens surface 22C on the two sides thereof. The bosses 22A of the entry-side lens array 22 are arranged on a line connecting the optical axes of lenses.

A section 22D is defined as a part of the entry-side lens array 22 that is located between upper and lower adherend surfaces 23 and that does not include the adherend surfaces 23. A plane P2 is defined as a plane that bisects the volume of the section 22D.

Figure 1:
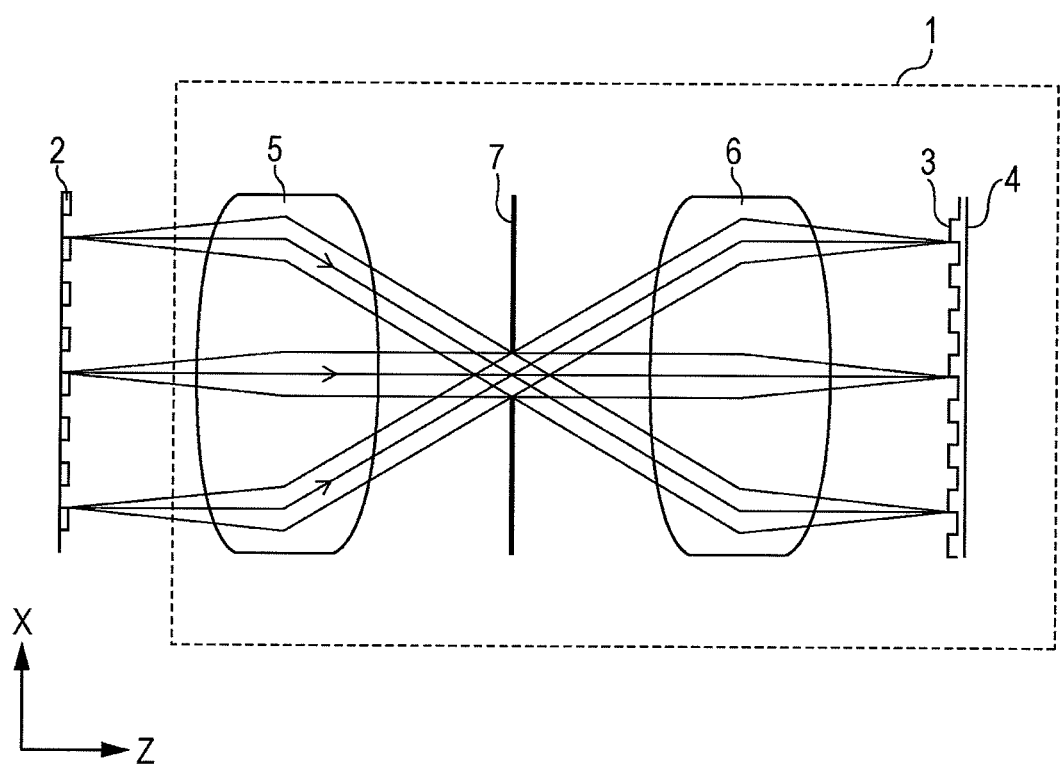
FIG. 1 is a schematic ray diagram illustrating an existing double telecentric optical system.
Figure 2:
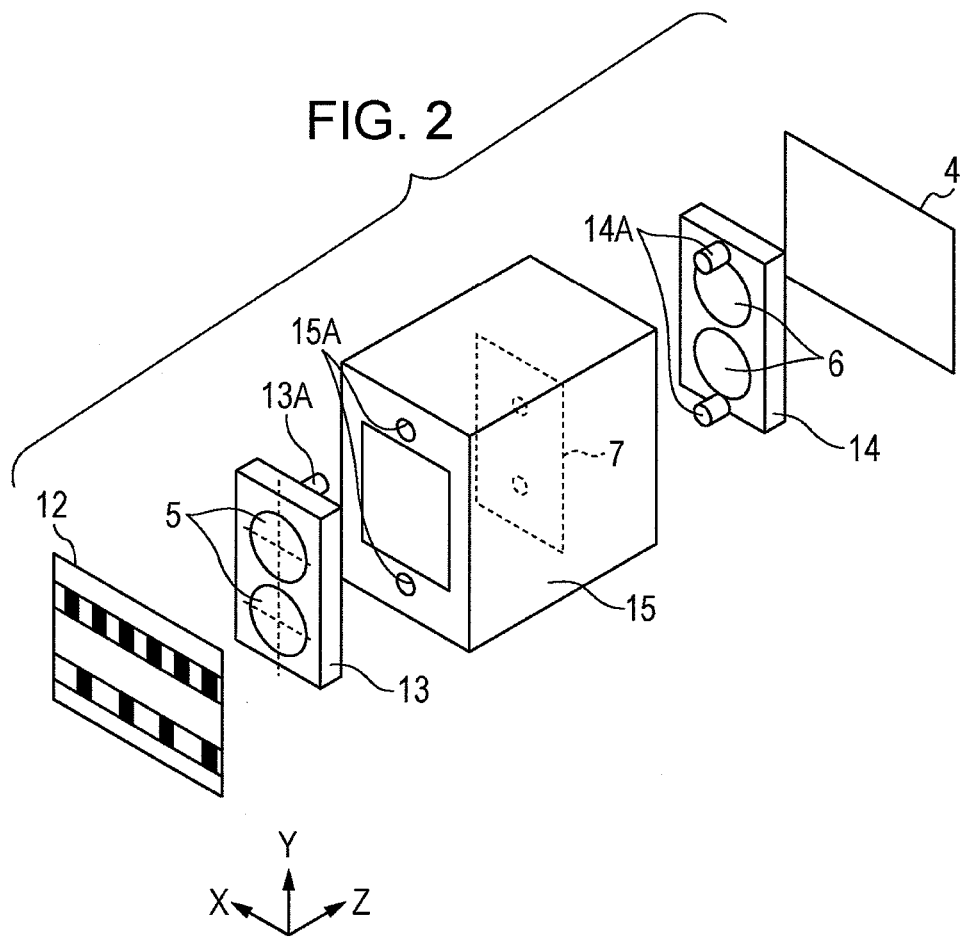
FIG. 2 is a schematic exploded perspective view of an existing optical encoder including a two-track scale and a double telecentric optical system.
Figure 3A:
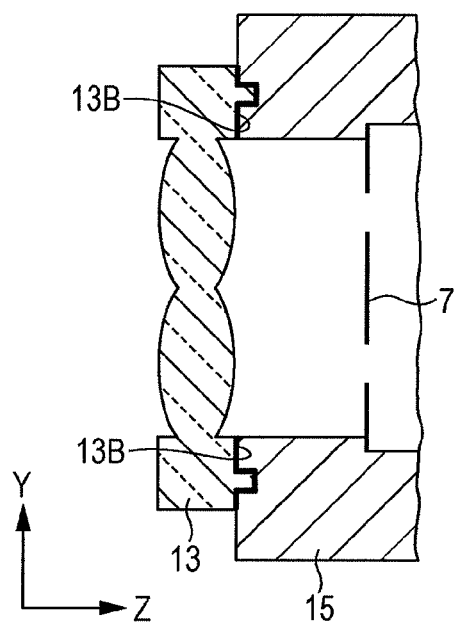
FIGS. 3A and 3B are schematic sectional views illustrating portions of a lens array that are bonded to a housing of the existing optical encoder.
Figure 3B:
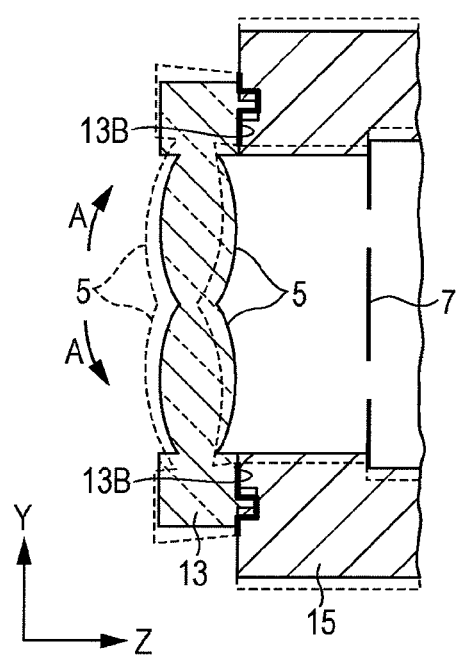

As compared with the existing structure described in FIGS. 3A and 3B, the positions of the adherend surfaces 23 are displaced so as to be located between the entry-side lens surface 22B and the exit-side lens surface 22C and on the volume-bisecting plane P2.

The lens is fixed to the housing 26 by applying an adhesive to the boss-insertion holes 26A and 26B in the housing 26 and inserting the bosses 22A into the boss-insertion holes 26A and 26B.

When the ambient temperature changes in a state in which the housing 26 and the entry-side lens array 22 are bonded to each other, the entry-side lens array 22 receives a stress from the adherend surfaces 23 as in the existing structure, because the coefficients of linear expansion of a plastic and a metal are different from each other. However, because the adherend surfaces 23 are on the volume-bisecting plane P2, which bisects the volume of the entry-side lens array 22, a stress that is generated on the entry-side lens surface 22B side and a stress generated on the exit-side lens surface 22C side cancel each other out. Therefore, in contrast to the existing structure, a warping force is not generated, and distortion of the lens surface is prevented.

The same structure can be used to fix the exit-side lens array 24 to the lens holder 30. The fixing method is not limited to adhesion.

With the structure described above, the optical system can be assembled easily with high accuracy; and yawing of the optical system and inter-track error caused by the optical system can be suppressed.

Even when components expand or contract due to variation in the ambient temperature, displacement of the optical axis in the X direction does not occur, because the positions of the optical elements are on the central symmetry line extending in the X direction. Therefore, the relationship between the optical axis and a measurement point does not change when the ambient temperature changes, and therefore position measurement can be performed stably.

Moreover, by using a lens array, the positions of two optical axes can be adjusted with high accuracy, the number of components can be reduced, and inter-track error caused by the optical system can be reduced.

In the first embodiment, the two-track scale 12 is used. As a second embodiment, an optical encoder may include a one-track scale and may have one optical axis.

As a third embodiment, an optical encoder may include a scale having three or more tracks, instead of the two-track scale 12, and may have three or more optical axes.

In the first embodiment, the optical system is a double telecentric optical system. However, the optical system is not limited to a double telecentric optical system.

In the first embodiment, the entry-side lens array 22 is fixed to the housing 26, and the exit-side lens array 24 is fixed to the lens holder 30. Conversely, the entry-side lens array 22 may be fixed to the lens holder 30, and the exit-side lens array 24 may be fixed to the housing 26.

The material of the lens is not limited to a plastic. As long as the bosses can be integrally formed with the lens, a glass may be used as the material of the lens.

What is claimed is:

1. An optical encoder comprising:
a scale having a track; and
a detection head for detecting the track, the detection head including
an imaging optics including
a lens including a pair of bosses that are integrally formed with the lens, the bosses being disposed with an optical axis of the lens therebetween, and
an aperture plate having a pair of reference-pin-insertion holes that are disposed with an aperture therebetween,
a housing having a pair of lens-boss-insertion holes and a pair of reference-pin-insertion holes that are disposed on a central symmetry plane, the housing including a pair of attachment portions that are disposed so as to be symmetrical with each other,
a lens holder having a pair of lens-boss-insertion holes and a pair of reference-pin-insertion holes that are disposed on the central symmetry plane,
a pair of reference pins for positioning the lens holder and the aperture plate relative to the housing, and
a light-receiving element on which the imaging optics forms an image of the track,
wherein an optical axis of the imaging optics is adjusted with respect to the bosses and the reference pins.

2. The optical encoder according to claim 1,
wherein the track is provided in a plurality, and the lens is a lens array including a plurality of lenses that are parallelly arranged so as to correspond to the tracks.

3. The optical encoder according to claim 1,
wherein a fixing surface of the lens at which the lens is fixed to the housing or to the lens holder is disposed on a plane that bisects the volume of the lens.

4. The optical encoder according to claim 2,
wherein a fixing surface of the lens at which the lens is fixed to the housing or to the lens holder is disposed on a plane that bisects the volume of the lens.

* * * * *